United States Patent [19]

Urai et al.

[11] Patent Number: 4,911,352
[45] Date of Patent: Mar. 27, 1990

[54] METHOD FOR ASSEMBLING A FRAMEWORK OF VEHICLE SEAT

[75] Inventors: Muneharu Urai; Shigeru Kanai, both of Akishima, Japan

[73] Assignee: Tachi-S Co., Ltd., Tokyo, Japan

[21] Appl. No.: 315,452

[22] Filed: Feb. 24, 1989

[51] Int. Cl.$^4$ .............................................. F16M 13/00
[52] U.S. Cl. ..................................... 228/119; 297/346
[58] Field of Search ............. 29/401.1, 402.19, 402.21; 297/344, 346; 228/119

[56] References Cited

U.S. PATENT DOCUMENTS

| 4,209,159 | 6/1980 | Becker et al. | 297/344 |
| 4,775,126 | 10/1988 | Yokoyama | 297/346 |

*Primary Examiner*—Kenneth J. Ramsey
*Attorney, Agent, or Firm*—Browdy and Neimark

[57] ABSTRACT

A method for assembling a framework of a vehicle seat, which is directed to assembling a non height adjustable framework with no height adjuster, from a height adjustable framework having the height adjuster, using the components of the latter wherein a bracket is provided on a slide adjuster and the height adjuster is interposed between a seat frame and the bracket. The method involves the steps of untilizing all of the components of the height adjustable frame, except for the height adjuster, forming an inwardly recessed area in the bracket, and welding the inwardly recessed area to the seat frame, to thereby assemble a non height adjustable framework having non such height adjuster and thus permit using in common the components of those two different frameworks.

7 Claims, 5 Drawing Sheets

METHOD FOR ASSEMBLING A FRAMEWORK OF VEHICLE SEAT

BACKGROUND OF THE INVENTION

1. Field of the Invention

The present invention relates to a method for assembling a framework of a vehicle seat such as the one in an automotive seat, and in particular is concerned with a method for assembling a framework of vehicle seat from another framework of the same seat, using the constituent components of the latter, whereby the same components may be used between those two frameworks.

2. Description of the Prior Art

As shown in FIG. 1, a conventional ordinary seat framework having a seat height adjuster (c) provided therein is constructed such that it comprises a pantype seat cushion frame (a') and a pair of seat slide adjusters (b1')(b2'), with the seat cushion frame (a') interposed between the two seat slide adjusters (b1') (b2') and that the seat height adjuster (c) includes two spaced-apart link members (c'2)(c'2) and a sector-gear plate (c1') which are, as shown, arranged such that one of the link members (c'2) is interposed between the forward portion of right-side lateral section of the seat cushion frame (a') and the right-side slide adjuster (b'2), whereas the other of the link members (c'1) and the sector gear plate (c1') are interposed between the forward portion of left-side lateral section of the seat cushion frame (a') and the left-side slide adjuster (b1'). Further, two bolts (C'4)(C'4) pass rotatably through the rearward portions of right and left sidewalls of the slide adjusters (b'2)(b'1), respectively, and are secured via slidable spacers (c'3)(c'3) to the rearward portions of right- and left-side lateral sections of the frame (a'), respectively. The seat height adjuster (c) is operatively connected with a control mechanism (c'5), and therefore the operation of the control mechanism (c'5) causes vertical movement of the forward portion of the seat cushion frame (a') relative to the bolts (c'4)(c'4) for adjustment in height of the frame (a').

According to this prior art, the seat cushion frame (a') is formed in its predetermined dimensions with its width (w1) being fixed and unchangeable, in in view of provision of the slide adjusters (b'1)(b'2) and above-mentioned interposition of the link member (c'2) as well as that of the link member (c'2) and sector gear plate (c'1).

In contrast to such seat height adjustable framework, there has been used, as well, a non seat height adjusting framework which has no such seat height adjuster (c') but merely has the slide adjusters (b'1)(b'2), wherein a seat cushion frame is integrally welded to the slide adjusters (b'1)(b'2).

Considering the above two different seat frameworks, there is an increased demand at the side of seat producing experts and workers in this field for using the same components for the seat assembling purpose, in the hope of simplifying the purchasing/storing managements of required components, reducing the number of the parts as well as the steps of seat assembly and attaining the lowest possible costs involved therein.

However, as mentioned above, as the width (W1) of the seat cushion frame (a') in the height adjustable framework (A') is unchangeable, it is practically impossible to directly use that seat cushion frame (a') in the non height adjustable framework stated above. This is because the non height adjustable framework is smaller in width than the seat cushion frame (a') by the amount of the space for installing the height adjuster (c'). As a result of that, there have been troublesome steps for forming another different components and putting together them to assemble a framework which permits use of the seat cushion frame (a').

SUMMARY OF THE INVENTION

With the above-stated drawbacks in view, it is a purpose of the present invention to provide a method for assembling a framework of a vehicle seat with no height adjuster, from another framework of vehicle seat having a height adjuster, using the constitute components of the latter, thereby permitting use of same components between the two different frameworks.

In achievement of such purpose, in accordance with the present invention, there is basically provided the steps of:

(a) utilizing the constituent components for assembling a first framework having a height adjuster therein, excepting the height adjuster, wherein the constituent components includes a pair of slide adjusters, a pair of brackets each being provided on the respective slide adjusters, and a seat frame provided movably between the pair of brackets, and wherein the height adjuster has parts, one of them being interposed between the left-side one of said brackets and left-side lateral portion of the seat frame, and the other of them being interposed between the right-side one of the brackets and right-side lateral protion of the seat frame, (b) forming an inwardly recessed area in each of the left- and right-side brackets, and (c) welding the two inwardly recessed areas to both lateral sides of the seat frame, thereby assembling a second framework in which the seat frame is integrally connected with the pair of slide adjusters via the pair of brackets.

Accordingly, a framework of vehicle seat with no such height adjuster is assembled from the constituent components of the one having the height adjuster. In other words, it is appreciated that the seat frame per se may be used in common between the two frameworks, without need for designing it newly for either of them, and that the formation of the inwardly recessed area in each of the two brackets permits direct connection between the brackets and seat frame and thus use of the original components of those two frameworks.

DETAILED DESCRIPTION OF PREFERRED EMBODIMENTS OF THE INVENTION

Figure 1:
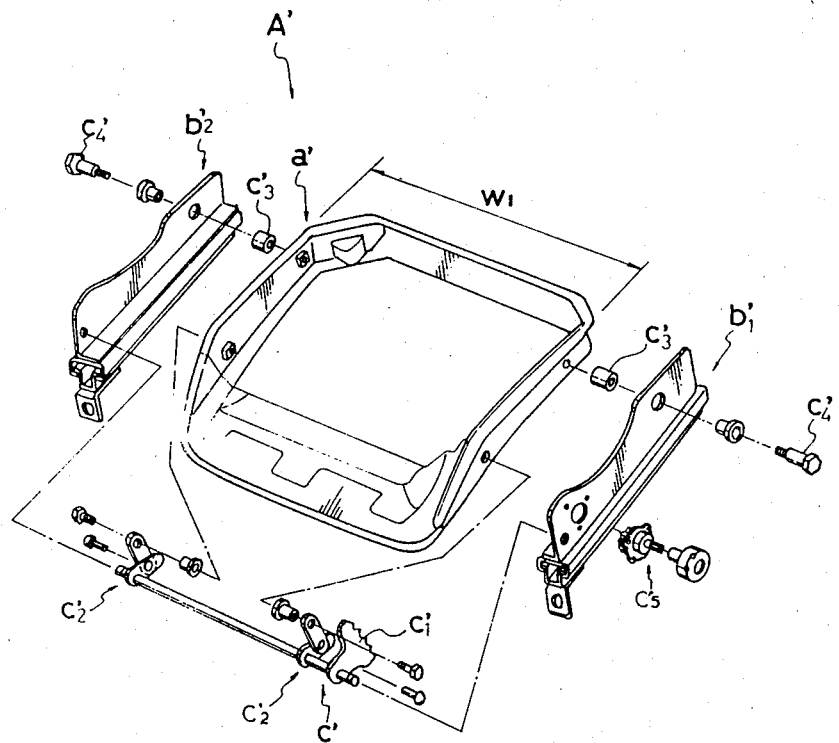
FIG. 1 is an exploded perspective view of a conventional seat framework having a height adjuster and slide adjuster.

With reference to FIGS. 2 through 5, a seat framework (A) is illustrated having a pair of slide adjusters (b1)(b2) and a seat height adjuster (c) (which will be referred to as "a height adjustable framework", hereinafter). In the height adjustable framework (A), a seat cushion frame (a), on which is mounted a seat cushion (not shown), is provided between the two slide adjusters.

First, in accordance with the present invention, such heigh adjustable framework will be employed and described with a view to explaining its constituent components.

Specifically, the seat cushion frame (a) is comprised of a forward frame member (11), a rearward frame member (12), and a pair of first and second lateral frame members (13)(14) which connect together the forward and rearward frame members (11)(12) in an integral manner, all of those frame members being welded together to provide a square configuration of the seat cushion frame (a). Each of the frame members (11)(12)(13)(14) is so formed as to have a channel-shaped cross-section and in particular, both forward and rearward frame members (11)(12) are formed in a generally U-shaped configuration such that both ends respectively of the two frame members (11)(12) are bent inwardly at a right angle and extend in the longitudinal direction of the lateral frame members (13)(14) to face each other.

The slide adjusters (b1)(b2) are each comprised of a lower rail (21) fixed on the floor of an automobile (not shown), an upper rail (22) which is slidably fitted in the lower rail (21), and a bracket (24) integral with the upper rail (22) and extending upright therefrom. The lower rail (21) has a pair of support legs (25)(26) provided thereunder at its forward and rearward ends, and by the two support legs (25)(26), the lower rail (21) is supported and fixed to the floor. The upper rail (22) is formed of two steel plate members of the illustrated configuration in section. The bracket (24) is integrally provided on the upper end of either of the two steel plate members of the upper rail (22) and extends upwardly therefrom.

Thus, as shown, the slide adjusters (b1)(b2), respectively, have the brackets (24)(24') extended upright therefrom, which brackets (24)(24') are each formed in the shape of a vertically extending flat plate.

Designation (27) denotes a locking lever for locking and unlocking the slide adjuster (b1).

Figure 2:
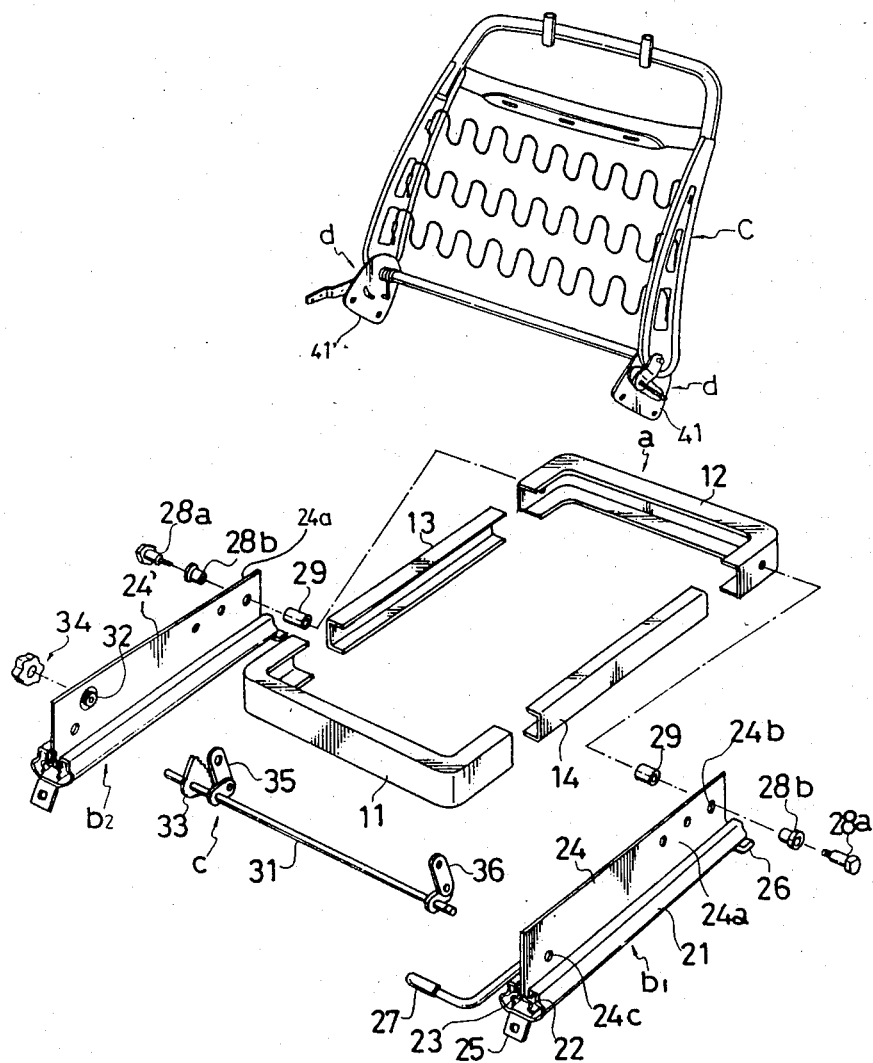
FIG. 2 is an exploded perspective view of a seat framework to be assembled by the present invention, which has a height adjuster and slide adjuster.
Figure 3:
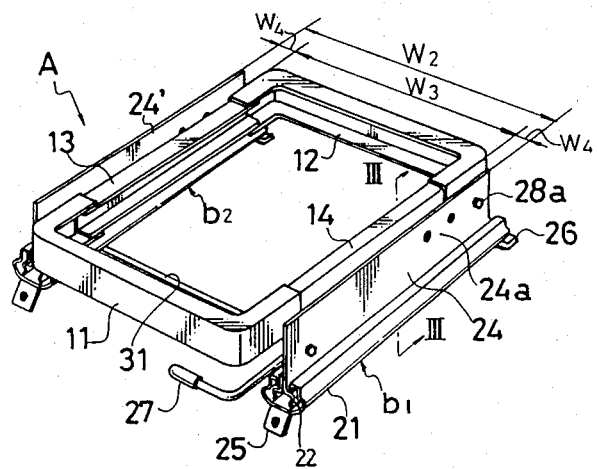
FIG. 3 is a perspective view of an assembled state of the same framework as in the FIG. 2.

As viewed from FIGS. 2 and 3, the left-side bracket (24) has, defined therein, a securing area (24a) in which the lower bracket (41) of a reclining device (d) is firmly secured, and further has, defined at its rearward end part, an aperture (24b) through which a securing bolt (28) and sleeve (28b) pass, and at its forward end part, an aperture (24c) through which a torque spindle (31) of the height adjuster (c) passes.

Although not shown clearly, the left-side bracket (24') has the same securing area, apertures, securing bolt and sleeve as stated above in the left-side bracket (24). For the sake of description below, regarding the left-side bracket (24'), the securing area is given a designation (24'a), the two apertures are given (24'b)(24'c), respectively, the bolt is given (28'a) and the sleeve is given (28'b).

Designation (c) denotes a seat back frame.

The height adjuster (c) is of a conventional type in common use with this kind of seat cushion frame, comprising the torque spindle (31) which is extended between the two brackets (24)(24') such that both ends of the torque spindle (31) are respectively rotatably inserted through the respective apertures (24c)(24'c) of the brackets (24)(24'c), a sector gear plate (33) fixed on the right-side end portion of the torque spindle (31) in the vicinity of the left-side bracket (24'), a pinion (32) mounted rotatably at the inner wall of of the left-side bracket (24'), the pinion (32) being in mesh with the toothed gear part of the sector gear plate (33), a control mechanism (34) which is operatively connected with the pinion (32) and provided with a non-reversible brake device (not shown), and a pair of link members (35)(36) which are so arranged that their respective upper ends are rotatably connected to the forward end part of the seat cushion frame (a) (i.e., the forward frame member (11)) while their respective lower ends are rotatably connected to the right- and left-side end parts of the torque spindle (31) in the vicinity of the right-side bracket (24') and the left-side one (24), respectively, as best understandable from FIG. 2.

The seat cushion frame (a) is at its rearward frame section (12) rotatably supported by the two bolts (28a)(28'a) which pass through the apertures (24b)(24'b) of brackets (24)(24'), respectively, as indicated above. As seen in FIG. 2, the right-side bolt (28a) extends through a first spacer (29) to the rearward end part of the seat cushion frame (a), (i.e., the rearward frame member (12), and on the other hand, the left-side bolt (28'a) extends through a second spacer (29') to the rearward end part of the frame (a).

With the above structure, the seat cushion (not shown) on the seat cushion frame (a) is vertically moved with respect to the pivot point at the bolts (28)(28') by the operation of the control mechanism (3) of the height adjuster (c), to thereby effect a desired adjustment of the seating height of the seat cushion.

A review of this structure, thus, reveals that the section gear plate (33) and link member (35) at the left-side end part of the torque spindle (31) are interposed between the inner wall of the left-side bracket (24') and the left-side lateral wall of the seat cushion frame (a), whereas the link member (36) is interposed between the inner wall of the right-side bracket frame (24) and the right-side lateral wall of the seat cushion frame (a). Similarly thereto, the first spacer (29) is interposed between the inner wall of the right-side bracket (24) and the right-side lateral wall of the seat cushion frame (a), whereas the second spacer (29') is interposed between the inner wall of the left-side bracket (24') and the left-side lateral wall of the seat cushion frame (a). The provision of those mechanical elements of the seat adjuster (c) and spacers (29)(29') defines a space (m) each in the two adjoining areas: The one between the left-side bracket (24') and seat cushion (a), and the other one between the right-side bracket (24) and the frame (a).

Figure 4:
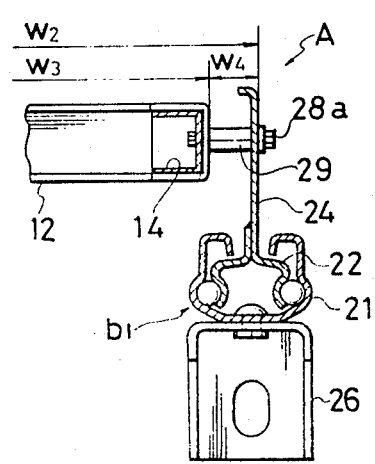
FIG. 4 is a sectional view taken along the line IV—IV in the FIG. 3.
Figure 5:
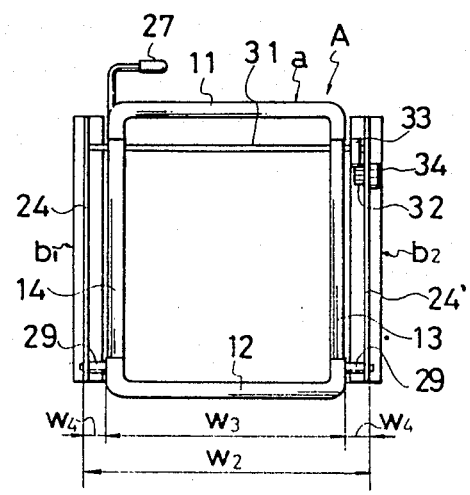
FIG. 5 is a plan view of the same framework as in the FIG. 3.

In the present embodiment, it can be appreciated from FIGS. 3, 4 and 5 that a total width between the left- and right-side brackets (24')(24) is measured by (W2), and therefore, each of the spaces (m) is measured by (W4) which is obtained by subtracting the width (W1) of the seat cushion frame (a) from the total width (W2) at the respective right and left end sides of the latter.

As described above, the height adjustable framework (A) is assembled from the above-explained components.

In accordance with the present invention, the steps thereof are now based on the utilization of the whole constituent components of the height adjustable framework excepting the height adjuster (c) in order to produce such a framework as shown in FIGS. 6 through 9.

Referring to the FIGS. 6 through 9, a description will be made of another type of seat framework (B) having no such height adjuster (c), which is yet basically similar in structure to the aforementioned seat framework (A), except that the seat framework (B) is provided with brackets (13a)(14a) different than the foregoing brackets (24')(24) and that the seat cushion frame of that framework (B) only comprises the forward and rearward frames (11)(12) of the foregoing seat cushion frame (a). This seat framework (B) will be referred to as "a non height adjustable framework" hereinafter.

Figure 6:
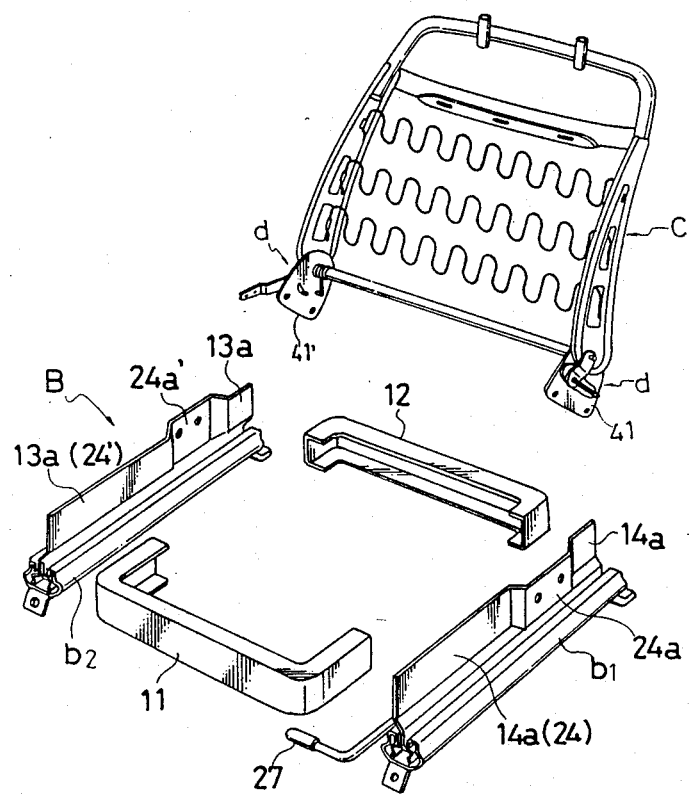
FIG. 6 is an exploded perspective view of another seat framework to be assembled by the present invention, which has no height adjuster, but a slide adjuster.
Figure 7:
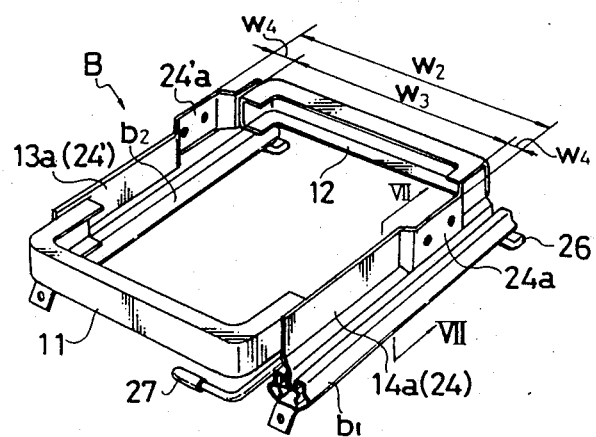
FIG. 7 is a perspective view of an assembled state of the same framework as in the FIG. 6.
Figure 8:
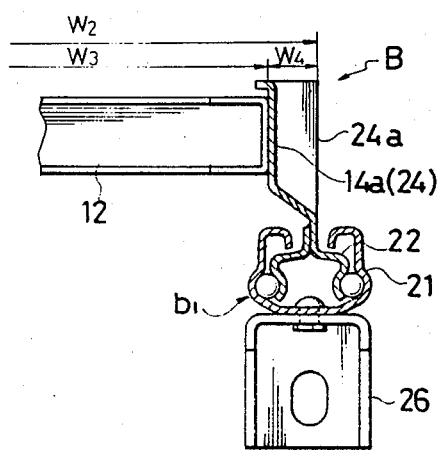
FIG. 8 is a sectional view taken along the line VIII—VIII in the FIG. 7.
Figure 9:
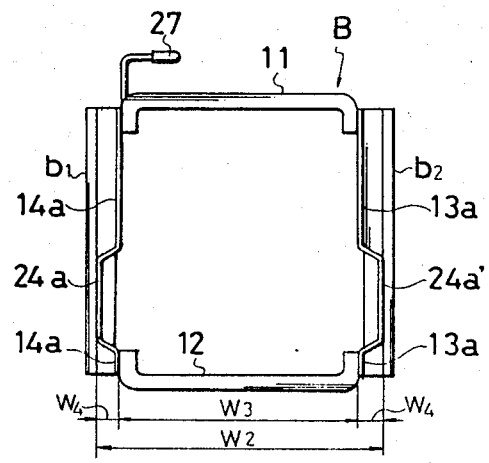
FIG. 9 is a plan view of the same framework as in the FIG. 7.

According to this embodiment, as viewed from FIG. 6, the left-side and right-side brackets (13a) (14a) are provided on the corresponding upper rails of the slide adjusters (b2)(b1), and the forward and rearward frame members (11)(12) are fixedly provided between those two brackets (13a)(14a). The two brackets (13a)(14a) are formed from the foregoing two brackets (24')(24), respectively, by means of a pressing work method or other suitable forming method.

More specifically, the left-side bracket (13a) is formed from the corresponding bracket (24') of the foregoing height adjustable framework (A) by pressing all areas of the latter, excepting the securing area (24'a) in which secured is the lower bracket of the reclining device (d), in a direction inwardly of the left-side slide adjuster (b2), so as to define an inwardly recessed rearward sidewall area 13'a). In forming those inwardly recessed areas (13a, 13'a), care should be taken that they are recessed inwardly at an amount corresponding to the width (W4) which is naturally created in the previously described height adjustable framework (A), as understandable from FIG. 7, so that the two sidewall areas (13)(13'a) are respectively in contact with the forward frame member (11) and rearward frame member (12).

Likewise, the right-side bracket (14a) is formed from the corresponding bracket (24) of the height adjustable framework (A), with an inwardly recessed forward sidewall area (14a) and an inwardly recessed rearward sidewall area (14'a) being defined therein by means of a press working method, excepting the securing area (24a), in the same way as in the above-stated left-side bracket (13a).

Accordingly, it is appreciated that a distance between the two paired sidewall areas (13a, 13'a, 14a, 14'a) is equal to the width (W3), and that the securing areas (24a)(14'a) remain unchanged at their original positions and spaced apart from each other at the width (W2).

Next, in an assembling process, the paired recessed forward sidewall areas (13a)(13'a) are welded to the left-side bent end portion of the forward frame (11) and that of the rearward frame member (12), respectively, while at the same time, the other paired recessed forward side wall areas (14a)(14'a) are welded to the right-side bent end portion of the forward frame member (11) and that of the rearward one (12), respectively, as in FIG. 4. Then, the two lower brackets (41')(41) of the reclining devices (d)(d) are secured to the two securing areas (24'a)(24a). As a result, the framework (B) is obtained.

It is thus appreciated that the inwardly recessed sidewall areas (13a)(13'a)(14a)(14'a) serve as a replacement for the two lateral frame members (13)(14) in this non height adjustable framework (B) having no such height adjuster (c) therein and further serve as a means to eliminate the two unnecessary spaces at (W4)(W4), without resort to other special parts and connecting means. The two lateral frame members (13)(14) are thus removed from the seat frame.

Accordingly, the method in accordance with the present invention permits use of almost all the components of the height adjustable framework (A) in order to assemble the non height adjustable framework (B). Namely, by simply subjecting to a press working the brackets (24)(24') of the former framework (A), obtained is the latter framework (B) with no height adjuster (c), which leads to the use in common of the constituent components of the two different frameworks (A)(B).

This greatly contributes to the reduction of costs involved in preparing the parts as well as the reduction of assembling steps.

In one aspect, in the case of such seat frame (a) comprising a forward frame member (11), a rearward frame member (12), and a pair of lateral frame members (13)(14), in accordance with the present invention, only the forward and rearward frame members (11)(12) are used, thus avoiding the necessity for preparing the two lateral frame members (13)(14), which also contributes to the cost-wise and time-wise reduction of the seat assembly.

What is claimed is:

1. A method for assembling a framework of a vehicle seat, comprising the steps of:

utilizing constituent components for assembling a first framework having a height adjuster therein, excepting said height adjuster, wherein said constituent components include a pair of slide adjusters for slidingly adjusting a position of said seat in a longitudinal direction thereof, a pair of brackets each being provided on the respective said pair of slide adjusters and having, defined therein, a securing area where a reclining device is secured, a seat frame provided movably between said pair of brackets, and wherein said height adjuster is adapted for adjusting a height of said seat and has parts, one of which parts is interposed between one lateral side of said seat frame and one of said brackets while the other of which parts is interposed between the other lateral side of said seat frame and the other of said bracket;

press forming a first inwardly recessed area in one of said brackets, excepting said securing area, and a second inwardly recessed area in the other of said brackets, excepting said securing area,;

welding said first and second inwardly recessed areas of said brackets to both lateral sides of said seat frame, respectively, wherein said first and second inwardly recessed areas are recessed in a direction inwardly of said brackets and faced toward each other; and thereby assembling a second framework in which said seat frame is integrally connected with said pair of slide adjusters via said pair of brackets.

2. A method for assembling a framework of a vehicle seat, comprising the steps of:

utilizing constituent components for assembling a first framework having a height adjuster therein, excepting said height adjuster, wherein said constituent components include a pair of slide adjusters for slidingly adjusting a position of said seat in a longitudinal direction thereof, a pair of brackets each being provided on the respective said pair of slide adjusters and having, defined therein, a securing area where a reclining device is secured, a seat frame provided movably between said pair of brackets, said seat frame including a forward frame member, a rearward frame member and a pair of lateral frame members, all of said frame members being welded together so as to provide a square configuration of said seat frame, wherein said height adjuster is adapted for adjusting a height of said seat and has parts, one of which parts is interposed between one lateral side of said seat frame and one of said brackets while the other of which parts is interposed between the other lateral side of said seat frame and the other of said brackets;

press forming, a first inwardly recessed area in one of said brackets, excepting said securing area, and a second inwardly recessed area in the other of said brackets, excepting said securing area;

removing said pair of lateral frame members from said seat frame;

welding said first and second inwardly recessed areas of said brackets to both lateral sides respectively of said forward and rearward frame members, wherein said first and second inwardly recessed areas are recessed in a direction inwardly of said brackets and faced toward each other; and thereby assembling a second framework in which said forward and rearward frame members are integrally connected with said pair of slide adjusters via said pair of brackets.

3. The method as defined in claim 1, wherein said pair of slide adjusters each comprise an upper rail and a lower rail, said upper rail being slidably fitted in said lower rail, and wherein said pair of backets in said first framework are each formed integral ly on the respective said upper rails of said pair of said slide adjusters, extending upwardly therefrom, and further each formed in a flat-plate-like shape.

4. The method as defined in claim 2, wherein said pair of slide adjusters each comprise an upper rail and a lower rail, said upper rail being slidably fitted in said lower rail, and wherein said pair of brackets in said first framework are each formed integral ly on the respective said upper rails of said pair of said slide adjusters, extending upwardly therefrom, and further each formed in a flat-plate-like shape.

5. The method as defined in claim 1, wherein lower brackets of said reclining device are secured in said securing areas of said brackets in said first framework.

6. The method as defined in claim 2, wherein lower brackets of said reclining device are secured in said securing areas of said brackets in said first framework.

7. The method as defined in claim 2, wherein said forward and rearward frame members as well as said pair of lateral frame members are each formed in a channel-shaped configuration in section, and wherein both ends respectively of said forward and rearward frame members are bent at a right angle in a longitudinal direction of said seat frame, such that said bent ends of said forward frame member and those of said rearward frame member are faced towards each other.

* * * * *